United States Patent [19]

Mitsuhashi

[11] Patent Number: 4,949,173
[45] Date of Patent: Aug. 14, 1990

[54] SECURITY SURVEILLANCE SYSTEM WITH INTERMITTENT MAGNETIC RECORDING/REPRODUCING DEVICE

[75] Inventor: Yasuo Mitsuhashi, Nagaokakyo, Japan

[73] Assignee: Mitsubishi Denki Kabushiki Kaisha, Tokyo, Japan

[21] Appl. No.: 266,297

[22] Filed: Oct. 31, 1988

Related U.S. Application Data

[63] Continuation of Ser. No. 909,304, Sep. 19, 1986, abandoned.

[30] Foreign Application Priority Data

Sep. 20, 1985 [JP] Japan .................................. 60-209417

[51] Int. Cl.$^5$ .............................................. H04N 7/18
[52] U.S. Cl. .................................. 358/108; 360/33.1; 360/35.1; 360/19.1; 358/343
[58] Field of Search ................. 360/32, 33.1, 9.1, 19.1, 360/35.1, 8; 358/105, 106, 107, 108, 343, 906

[56] References Cited

U.S. PATENT DOCUMENTS

| | | | |
|---|---|---|---|
| 3,542,906 | 11/1970 | Warren | 358/328 X |
| 3,909,512 | 9/1975 | Omori et al. | 360/8 |
| 4,224,642 | 9/1980 | Mawatau et al. | 360/22 X |
| 4,326,218 | 4/1982 | Coutta et al. | 358/108 |
| 4,468,708 | 8/1984 | Coleman, Jr. | |
| 4,510,526 | 4/1985 | Coutta et al. | 358/108 |
| 4,511,886 | 4/1985 | Rodriguez | 358/108 X |
| 4,531,161 | 7/1985 | Murakoshi | 360/19.1 X |
| 4,542,419 | 9/1985 | Mono et al. | 360/19.1 |
| 4,607,293 | 8/1986 | Okada et al. | 360/19.1 X |
| 4,654,724 | 3/1987 | Nagano | 358/343 X |
| 4,725,897 | 2/1988 | Konishi | 358/906 X |
| 4,751,590 | 6/1988 | Wilkinson | 358/343 X |

FOREIGN PATENT DOCUMENTS

| | | |
|---|---|---|
| 25277 | 3/1981 | European Pat. Off. ............ 358/343 |
| 0123111 | 3/1984 | European Pat. Off. . |
| 2457636 | 6/1976 | Fed. Rep. of Germany . |
| 3034716 | 4/1981 | Fed. Rep. of Germany . |
| 55-77012 | 6/1980 | Japan .................................. 360/19.1 |
| 58-62985 | 4/1983 | Japan . |
| 7932803 | 2/1979 | United Kingdom . |
| 2102183 | 4/1982 | United Kingdom . |

OTHER PUBLICATIONS

Video Recorder with Multiplex Audio, Frost et al., vol. 11, No. 7, Dec. 1968, p. 793, IBM Tech. Disclosure Bulletin.

"Picture Processing for the 4:2:2 Digital Videotape Recorder", Eguchi et al., SMPTE Journal, Oct. 1985, pp. 1002–1006.

"Digital Video Recording–Some Experiments and Future Considerations", Moryono et al., SMPTE Journal, vol. 89, Sep. 80, pp. 658–662.

K. Sadashige, "Developmental Trends for Future Consumer VCRs", SMPTE Journal (Dec. 1984), pp. 1138–1146.

Primary Examiner—Aristotelis M. Psitos
Attorney, Agent, or Firm—Lowe, Price, LeBlanc, Becker & Shur

[57] ABSTRACT

The intermittent magnetic recording/reproducing device of the present invention intermittently drives a rotating drum (10) by an intermittent driving circuit (6) and surface-records a frequency-modulated video signal on a magnetic tape intermittently by video heads (11, 12). On the other hand, an audio signal is converted into a digital signal by an AD converter (22), whose bit number is decreased by a 6-4 converter (23) and a correction code is added thereto by a correction code generation circuit (24). The time base of the digital audio signal is compressed by a time base compression modulation circuit (25) and the signal is deep-recorded on the magnetic tape by audio heads (13, 14) provided on the rotating drum (10). Audio heads (13, 14) have a wider gap width than the video heads (11, 12) and the azimuth angle thereof is different from that of the video heads. Therefore, even if the video signal and the digital audio signal are recorded on the same track, there is no interference between each other.

5 Claims, 6 Drawing Sheets

SECURITY SURVEILLANCE SYSTEM WITH INTERMITTENT MAGNETIC RECORDING/REPRODUCING DEVICE

This application is a continuation of Application Ser. No. 909,304, filed Sept. 19, 1986, now abandoned.

BACKGROUND OF THE INVENTION

1. Field of the Invention

The present invention relates to an intermittent magnetic recording/reproducing device. More specifically, it relates to an intermittent magnetic recording/reproducing device such as a long time video tape recorder for keeping watch mainly for preventing crimes, in which video signals are recorded intermittently on a magnetic tape.

2. Description of the Prior Art

FIG. 1 is a block diagram showing the structure of a conventional intermittent magnetic recording/reproducing device.

The structure of a conventional intermittent magnetic recording/reproducing device will be described with reference to FIG. 1. A video signal from a television camera inputted to an video input terminal is applied to a video amplifier 1 having high input impedance and is amplified. The video signal amplified by the video amplifier 1 is applied to a video recording circuit 2. The video recording circuit 2 comprises a FM modulator for modulating the video signal into a FM signal. The signal FM-modulated by the video recording circuit 2 is applied to a FM signal amplifier 3 to be amplified and applied to video heads 11 and 12 provided on a rotating drum 10 through a mode selecting switch 4. Video heads 11 and 12 record the signal on a magnetic tape. The mode selecting switch switches the operation mode between the recording mode and the reproduction mode. In the reproduction mode, a FM signal detected from the magnetic tape by the video heads 11 and 12 is applied to a video signal reproduction circuit 5. The video signal reproduction circuit 5 demodulates the FM signal detected by the video heads 11 and 12 and outputs an original video signal to a video output terminal.

An intermittent driving circuit 6 rotates a capstan shaft 16 synchronously with a vertical synchronization signal. A pinch roller 17 is provided opposed to the capstan shaft 16, whereby a magnetic tape 15 is intermittently driven by the capstan shaft 16 and the pinch roller 17. FIG. 2 is a time chart illustrating the operation of the intermittent magnetic recording/reproducing device shown in FIG. 1 and FIG. 3 is a schematic diagram showing a track of a magnetic tape on which a video signal is recorded by the intermittent magnetic recording/reproducing device shown in FIG. 1.

The operation of a conventional intermittent magnetic recording/reproducing device will be hereinafter described with reference to FIGS. 1 to 3. A video signal changed into a FM signal through the video amplifier 1, video recording circuit 2 and the FM signal amplifier 3 is applied to the video heads 11 and 12 on the rotating drum 10 through the mode selecting switch 4. The television signal transmitted from a television camera is composed of successively adjacent fields $V_0, V_1 \ldots V_9, V_{10}, V_{11}, V_{12} \ldots$, respectively, as shown in FIG. 2(a). In a video tape recorder for intermittent recording/reproducing, if these fields are recorded continuously, much magnetic tape 15 is consumed. Therefore, an existing type video tape recorder can record at most for about 8 hours. However, if 2 fields out of every 40 fields are recorded intermittently, as shown in FIG. 2(c), recording for a long period of time, that is, 8 hours $\times 40/2 = 160$ hours becomes possible.

In order to record intermittently, the magnetic tape 15 must be moved intermittently as shown in FIG. 2(b) and video tracks which are recorded intermittently on the magnetic tape 15 must be in contact with the next track successively with inclination. Therefore, the intermittent driving circuit 6 generates an intermittent driving pulse signal on a basis of the vertical synchronization signal and applies this pulse signal to a capstan motor driving circuit (not shown). The capstan motor driving circuit accurately put forward the magnetic tape 15 intermittently by the rotation of the capstan shaft 16 and the pinch roller 17.

The aforementioned operation is completed by the writing into the magnetic tape 15 by the video heads 11 and 12 on the rotating drum 10. Similar to a common video tape recorder, the heads gap width of the video heads 11 and 12 are both as narrow as 0.25 $\mu$m, and the intermittent recording is a surface layer recording in which only the surface layer of the magnetic tape 15 is used.

During reproducing, a FM signal detected by the video heads 11 and 12 from the magnetic tape 15 is applied to the video signal reproducing circuit 5 and demodulated to obtain the original video signal.

A conventional video tape recorder for intermittent recording/reproducing is structured such that the tape runs intermittently, so that an audio signal can not be recorded at the upper end of the magnetic tape (linear audio track) by a fixed head. Namely, the audio signal can not be recorded for about 0.63 second while the magnetic tape is stopped. Consequently, a conventional video tape recorder for intermittent recording/reproducing abandoned the recording of the audio signal. Accordingly, there arises a problem that due to the lack of that function, there is no audio information in the case of accident.

SUMMARY OF THE INVENTION

A principal object of the present invention is to provide an intermittent magnetic recording/reproducing device which is capable of recording/reproducing an audio signal.

In the intermittent magnetic recording/reproducing device according to the present invention, an inputted audio signal is changed into a digital signal through AD conversion, and the digital audio signal is compressed on a time base corresponding to the intermittent running of the magnetic tape. The magnetic tape runs intermittently, and the video signal is intermittently recorded successively on the tracks inclined to the running direction of the magnetic tape by the video heads provided on the rotating drum while the compressed digital signals are recorded on the same tracks successively in contact with each other by an audio head.

Therefore, according to the present invention, a video signal can be recorded and reproduced intermittently, and in addition an audio signal can be recorded on the same magnetic tape without intervals.

In a preferred embodiment of the present invention, the gap width of the audio head is selected to be wider than that of the video head and azimuth angles of the audio head and the video head are different from each other, the audio signal is recorded on the deep layer of the magnetic tape by the audio head while the video signal is recorded in the surface layer thereon by the video head.

Therefore, in the preferred embodiment of the present invention, the audio signal and the video signal do not interfere with each other since the former is recorded on the deep layer and the latter is recorded on the surface layer of the magnetic tape.

Furthermore, in the preferred embodiment of the present invention, the bit number of the AD converted digital audio signal is compressed and, in addition, an error correction code is added and recorded on the magnetic tape.

These objects and other objects, features, aspects and advantages of the present invention will become more apparent from the following detailed description of the present invention when taken in conjunction with the accompanying drawings

DESCRIPTION OF THE PREFERRED EMBODIMENTS

Figure 4:
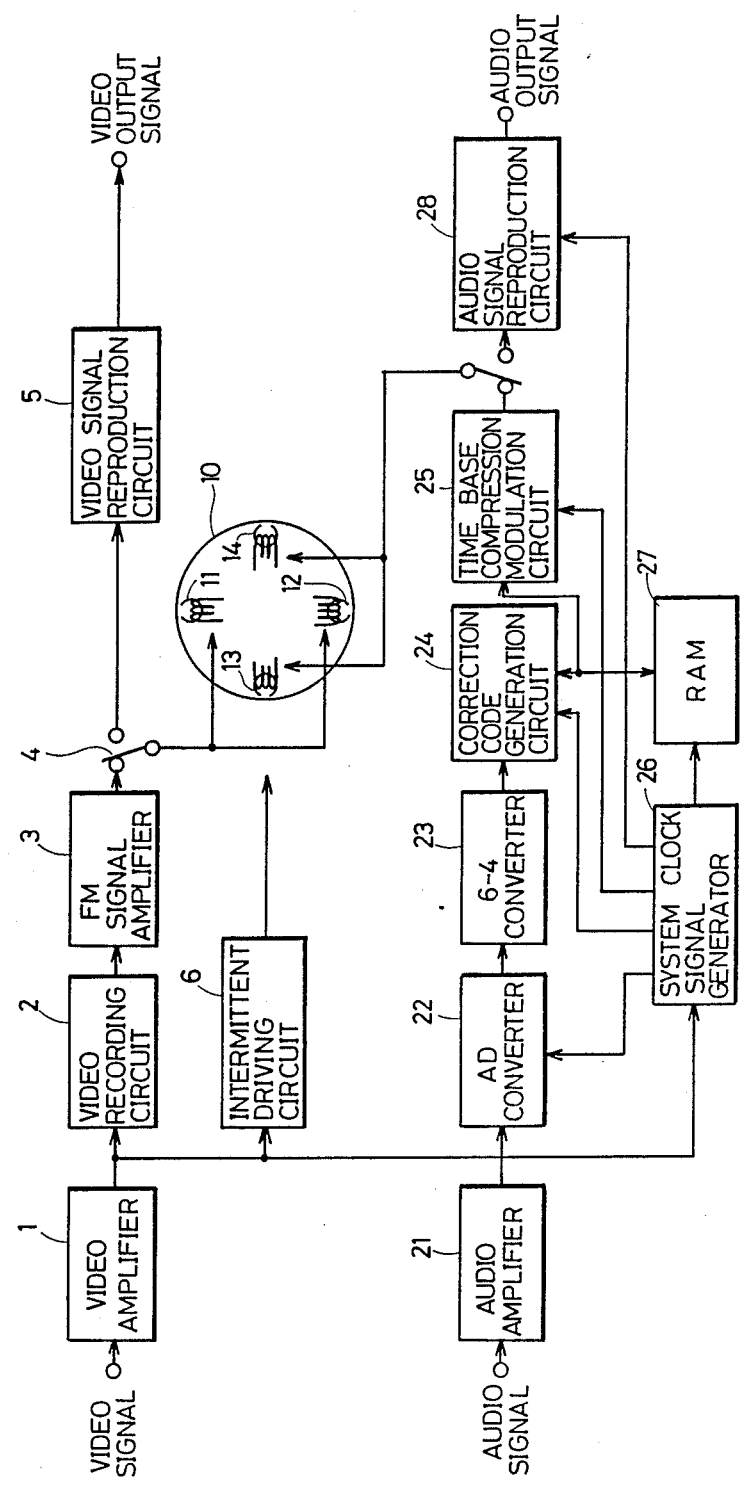
FIG. 4 is a schematic block diagram of one embodiment of the present invention.

FIG. 4 is a schematic block diagram of one embodiment according to the present invention.

Figure 1:
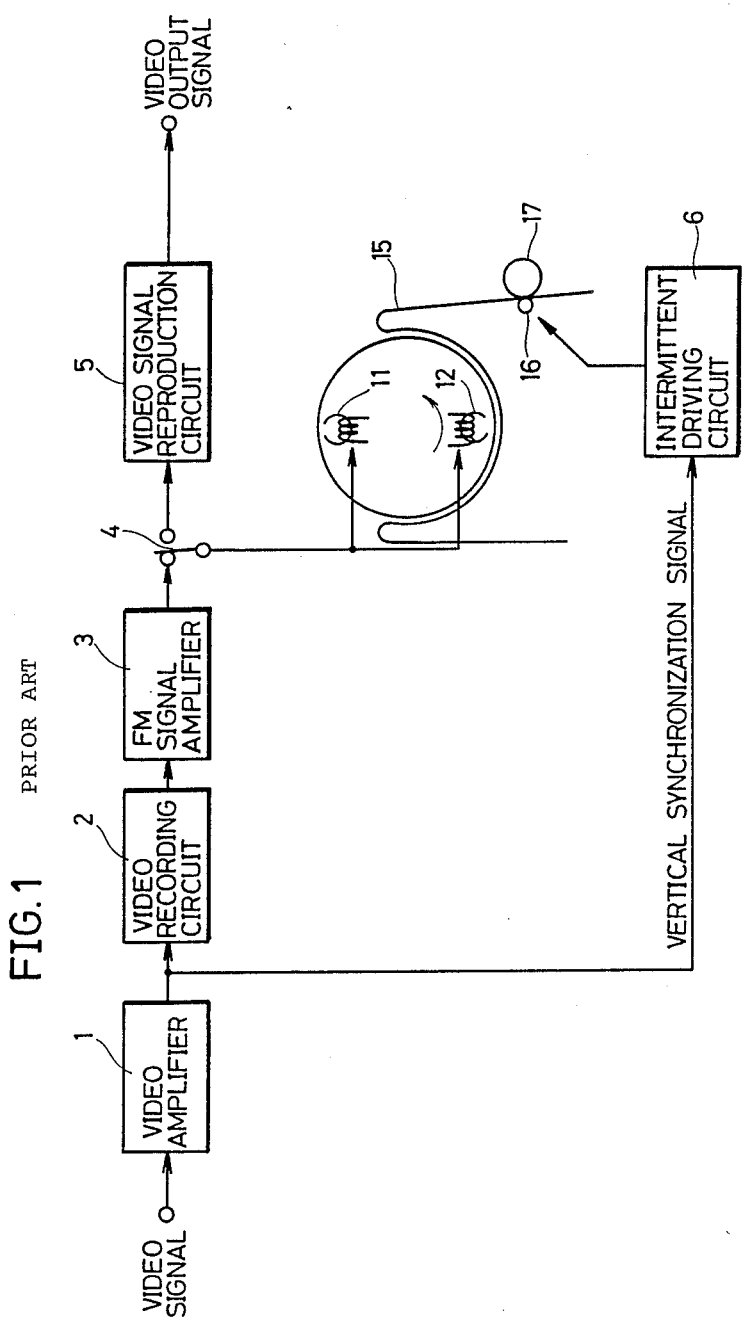
FIG. 1 is a schematic block diagram showing the structure of a conventional intermittent magnetic recording/reproducing device.

The structure of one embodiment of the present invention will be described with reference to FIG. 4. In FIG. 4, the video system and the driving system are the same as those described with reference to FIG. 1.

An audio signal inputted to an audio input terminal is applied to an audio amplifier 21. The audio signal is amplified by the audio amplifier 21 and applied to an AD converter 22. The AD converter converts the inputted audio analog signal into, for example, a 6-bit digital audio signal. The digital audio signal which is converted into 6-bit by the AD converter 22 is applied to a 6-4 converter 23 and the quantization bit number of 6 bits, is compressed to, for example, 4 bits. The bit number is decreased in order to simplify the hardware. Generally, compression of the bits decreases the dynamic range causing degradation of the tone quality. However, 4-bit is enough for a video tape recorder for a guard system.

The digital audio signal which is converted into 4-bit is applied to a correction code generation circuit 24 and a correction code is generated. The correction code is to decrease the malfunction of the system. Although there are many types of the correction codes, preferably a correction code should be generated at each word such as in the case of parity check. The correction code generated at the correction code generation circuit 24 is stored in a RAM 27 and added to the 4-bit digital audio signal. In addition, the time base compression modulation circuit 25 reads the digital audio signal and the correction code stored in the RAM at a rate faster than writing, and modulate them with a compressed time base. The output of the time base compression modulation circuit 25 is applied to the audio heads 13 and 14 through the mode selecting switch 4b. The mode selecting switch 4b is structured similar to the mode selecting switch 4a for the video signal. When the mode selecting switch 4b is switched to the reproduction mode, the digital audio signal detected by the audio heads 13 and 14 is applied to the audio signal reproduction circuit 28, and the original audio signal is reproduced and outputted at the audio output terminal.

Meanwhile, the gap width of the audio heads 13 and 14 is selected to be wider than those of the video heads 11 and 12 and the azimuth angles of the audio and video heads are different from each other. A system clock signal from a system clock signal generator 26 is applied to the above described AD converter 22, correction code generation circuit 24, time base compression modulation circuit 25, RAM 27 and audio signal reproduction circuit 28.

Figure 5:
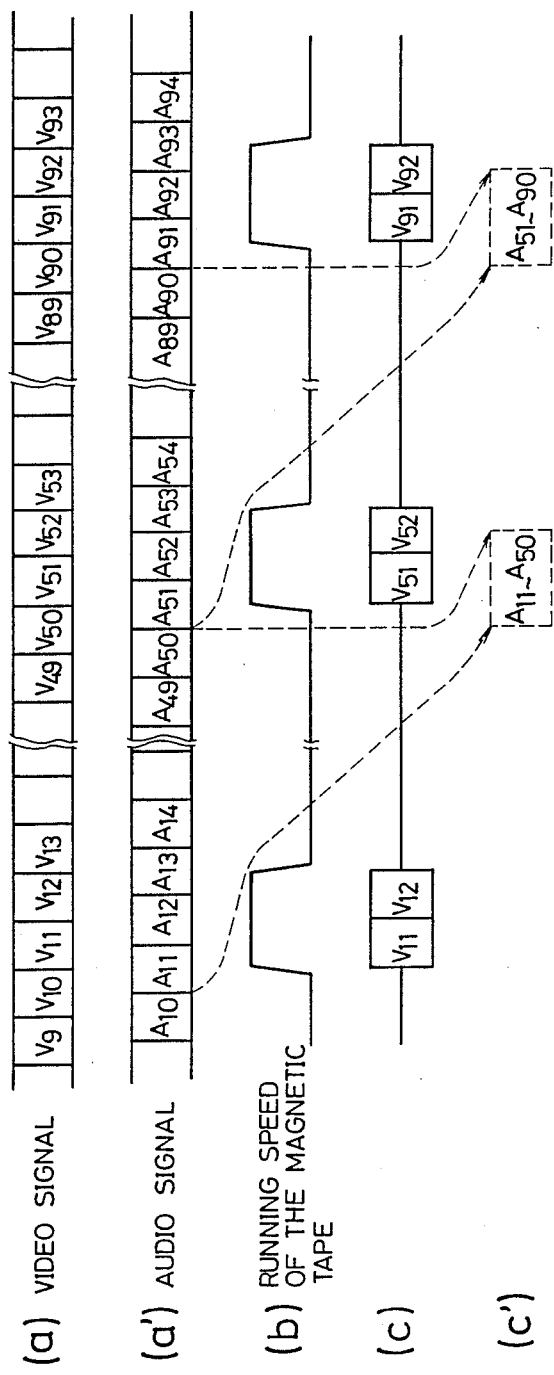
FIG. 5 is a time chart showing the operation of one embodiment of the present invention.
Figure 6:
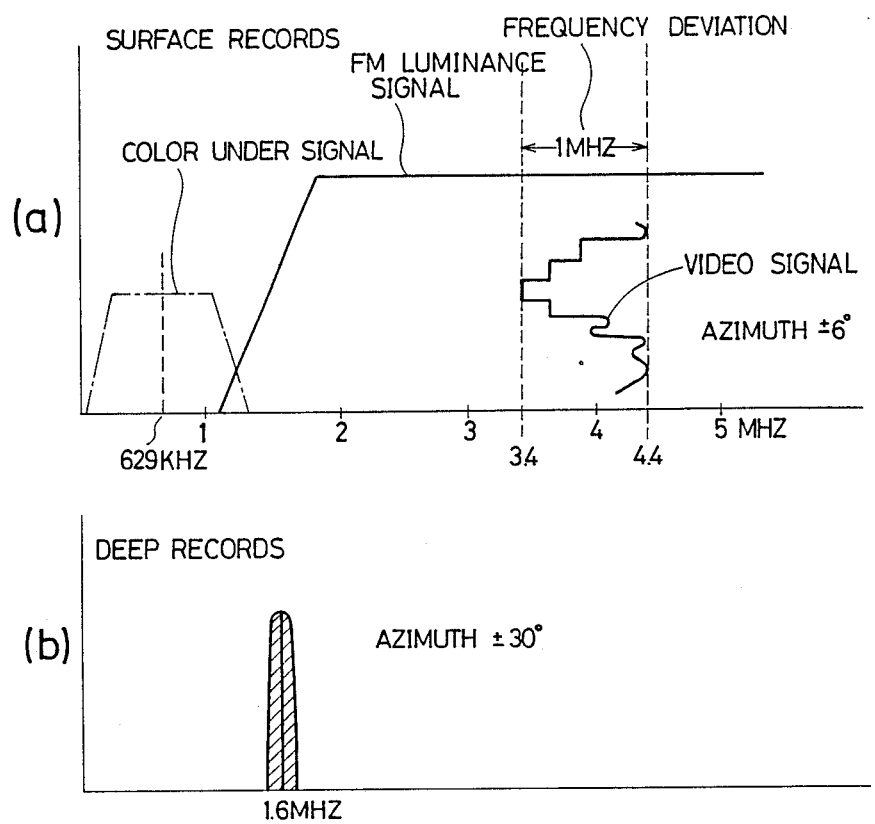
FIG. 6 is a characteristic diagram showing the frequency relations of the surface recording and the deep recording in one embodiment of the present invention.
Figure 7:
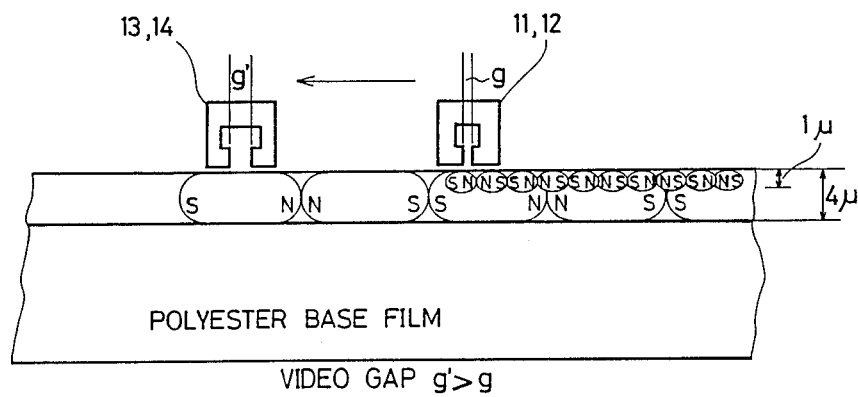
FIG. 7 is a cross sectional view of a magnetic tape on which both the surface recording and deep recording are performed according to one embodiment of the present invention.
Figure 8:
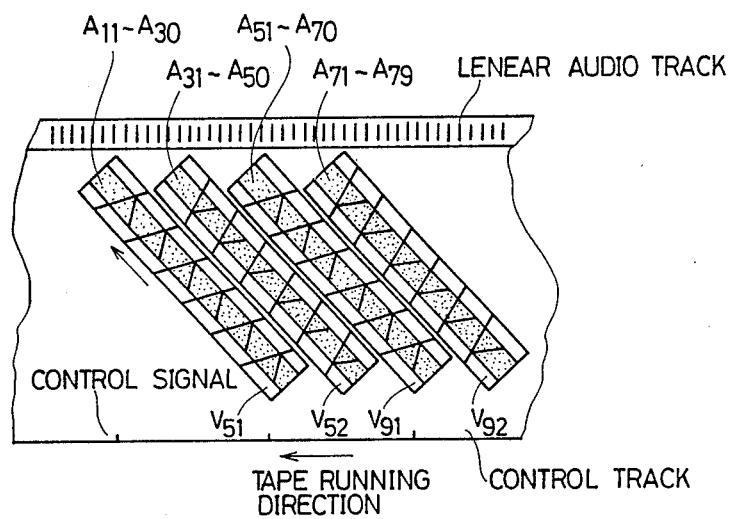
FIG. 8 shows tracks of the magnetic tape on which both the surface recording and the deep recording are performed according to one embodiment of the present invention.

FIG. 5 is a time chart showing the operation of one embodiment of the present invention; FIG. 6 is a diagram showing the frequency relation of the surface recording and the deep recording in one embodiment of the present invention; FIG. 7 is a cross sectional view of a magnetic tape on which both surface and deep recording are performed according to one embodiment of the present invention; and FIG. 8 shows tracks of a magnetic tape on which both surface and deep recordings are performed according to one embodiment of the present invention.

The specific operation of one embodiment of the present invention will be hereinafter described with reference to FIGS. 4 to 8. A video signal is recorded intermittently on the magnetic tape in the same manner as described with reference to FIG. 1, while an audio signal is amplified by an audio amplifier 21 and converted into a digital signal by an AD converter 22 and quantized. Generally, according to a sampling theory in which successive analog signals are sampled at a prescribed time period to be indicated, if the sampling is carried out at a frequency more than twice the maximum frequency of the spectrum distribution of the signals, the original waveform can be perfectly reproduced. Meanwhile, the frequency characteristics of 10kHz is sufficient for identifying the audio signal. Therefore, in this case, sampling by the sampling clock of 20kHz frequency is sufficient. If the frequency of the sampling clock is 20kHz, the frequency of the reproduced audio signal is 20/2=10kHz, which is sufficient as the sound for a video tape recorder of a guard system.

The bit number of the 6-bit digital audio signal. which is AD-converted as described above is decreased from six to four by 6-4 converter 23. The digital audio signal with the decreased bit number is applied to the correction code generation circuit 24 and a correction code is generated. The generated correction code as well as the digital audio signal is written in the RAM 27. The time base compression modulation circuit 25 reads the digital audio signal at a rate faster than that of writing the same to compress the time base of the digital audio signal to 1/20. For example, the transfer rate of the data obtained from the 6-4 converter 23 is, 20kHz×4bit=80kBPS, In order to compress the time base to 1/20, the data of 80kBPS should be read at 20 times faster rate. Namely, the data stored in the RAM 27 is read at a fast rate of 80kBPS×20=1.6MBPS, digital-modulated by using, for example, a Bi-Phase modulation system by the time base compression modulation circuit 25 and then amplified to be applied to the audio heads 13 and 14 through the mode selecting switch 4b and recorded in the magnetic tape.

Now, as shown in FIG. 5(a), the video signals from a television camera are transmitted successively by fields $V_0, V_1 \ldots$ on the basis of the vertical synchronization signal. On the other hand, as shown in FIG. 5(a'), the audio signals from a microphone etc. are transmitted subsequently, as $A_0, A_1 \ldots$ There is no particular reference signal, so that these audio signals are transmitted as successive analog signals. In FIG. 5(a'), the audio signals are denoted as $A_0, A_1 \ldots$ similar to the video signals in order to mark out the time period. In a general video tape recorder for successive recording, the magnetic tape runs at a constant rate and the video signals are recorded subsequently such as $V_0, V_1 \ldots$ in the inclined direction by the rotating video head while the audio signals are recorded continuously such as $A_0, A_1 \ldots$ in the 1 mm width portion at the upper end of the tape by a fixed linear audio head.

Figure 2:
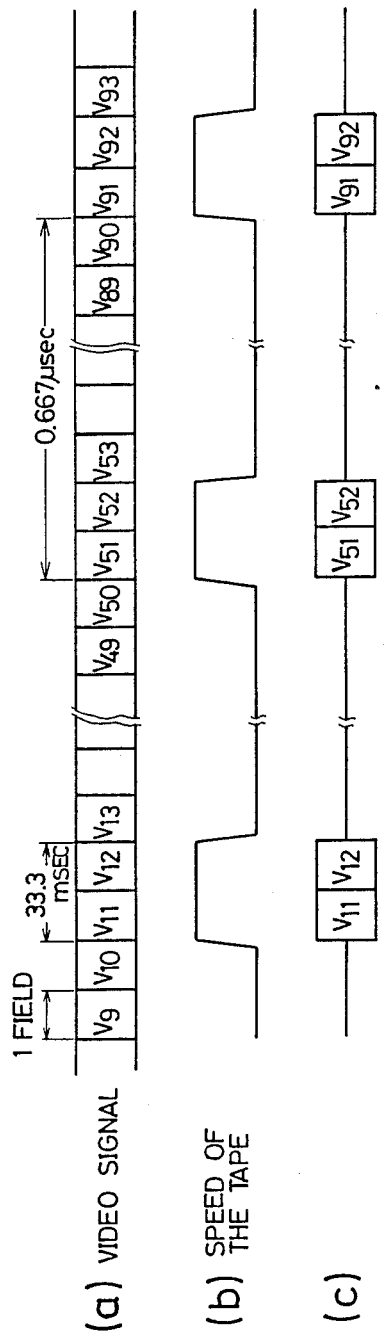
FIG. 2 is a time chart showing the operation of the intermittent magnetic recording/reproducing device shown in FIG. 1.
Figure 3:
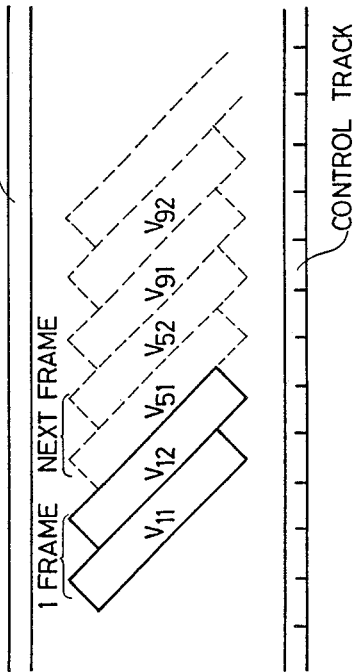
FIG. 3 shows tracks of a magnetic tape on which a video signal is recorded by the intermittent magnetic recording/reproducing device shown in FIG. 1.

However, in an intermittent video tape recorder, the running speed of the magnetic tape changes stepwise as shown in FIG. 5(b) as described above with reference to FIG. 2, so that the fields (or frame) of the video signal selected during the running only are recorded. As for the audio signals, the successive analog audio signals $A_{11}$ to $A_{50}$ for 0.667 sec are converted into digital audio signals as described above and the time base thereof is compressed as is shown by the dotted line in FIG. 2(c').

On the other hand, as for the video signals, only the fields $V_{11}$ and $V_{12}$ are selected from the successive $V_{11}$ to $V_{50}$ for 0.667 sec, and only the fields $V_{51}$ and $V_{52}$ are selected out of $V_{51}$ to $V_{90}$ for the next 0.667 sec.

Thus, the video signals are applied to the video heads 11 and 12 while the digital audio signals are applied to the audio heads 13 and 14. The video signal is modulated in the frequency relation as shown in FIG. 6(a) while the audio signal is digital-modulated in the frequency shown in FIG. 6(b). The gap width g of the video heads 11 and 12 which are provided on the rotating drum 10 for recording the video signals is as small as 0.25 μm and the azimuth angle is ±6°. On the other hand, the gap width g' of the audio heads 13 and 14 for recording the digital audio signals is as large as 1.0 μm and the azimuth angle is selected to be ±30°.

By making the bandgap and the azimuth angle of the video heads 11 and 12 and audio heads 13 and 14 different from each other, the digital audio signals with compressed time base shown by the dotted line in FIG. 5(c') are recorded in the deep layer of the magnetic tape by the audio heads 13 and 14 and the video signals of the selected fields are recorded thereon by the video heads 11 and 12 as shown in FIG. 7. Since the gap width and the azimuth angles of the video heads 11 and 12 and audio heads 13 and 14 are different from each other, there is no interference between the recorded video signal and the digital audio signal, so that there is no problem in practical use.

FIG. 8 is a top view of the magnetic tape shown in FIG. 7. As may be seen from the figure, writing-recording is performed twice at every track in the vertical direction of the tape by two heads.

Although a specific embodiment with specific numbers and values was described above, it is not for limitation. There are various ways to compress the time base of the digital audio signal. If there is much compression, a larger intermittent period can be selected. The higher the frequency of the reading clock signal of the RAM 27, a larger intermittent period can be selected. However, it should be noted that in this case interference is apt to occur since the frequency of the clock signal become close to the FM modulation frequency of the video signal.

In the embodiment of the present invention, the tone quality is deteriorated to some extent since the time base is compressed and the bit number is decreased. In order to prevent the deterioration, a noise reduction circuit may be inserted in the prestage of the audio amplifier 21 or between the audio amplifier 21 and the AD converter 22 to enhance the S/N.

Although the description of the reproduction circuit and 28 is omitted above, the operation is reverse to that of recording.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproducing device for use with a security surveillance system for recording an inputted video signal together with a continuous audio signal on a periodically operated magnetic tape, comprising:

driving means for periodically running the magnetic tape,

AD converting means for continuously converting an inputted audio signal into a digital signal which is suitable to be recorded on said magnetic tape, compression means for compressing the digital signal outputted from said AD converting means on a time base in response to the periodic running of said magnetic tape, and recording means including a rotating drum having on the outer surface a video head and an audio head, for recording said inputted video signal and the compressed audio signal which is compressed by said digital compression means in adjacent tracks inclined to the running direction of said magnetic tape, said recording means further comprising means for deep-recording said audio signal by said audio head on said magnetic tape and for surface-recording a portion of said video signal corresponding to said deep-recorded audio signal by said video head thereon whereby said corresponding video signal is recorded in a track positioned over a track of said deep-recorded audio signal track.

2. An intermittent magnetic recording/reproducing device according to claim 1, wherein
   the gap width of said audio head is selected to be wider than the gap width of said video head and the azimuth angle of said audio head and said video head are selected to be different from each other.

3. An intermittent magnetic recording/reproducing device according to claim 1, further comprising
  bit number converting means for compressing the number of bits of said digital signal which is an output of said AD converting means, and
  correction code generation means for adding a error correction code to the digital signal outputted from said bit number converting means.

4. An intermittent magnetic recording/reproducing device according to claim 3, further comprising
  temporary storing means for temporarily storing the digital signal to which the error correction code is added by said correction code generation means, and
  time base compression means for compressing the time base of said digital signal by reading the digital signal stored in said temporarily storing means at a reading rate which is faster than the writing rate.

5. A periodic magnetic recording/reproducing device for use with a security surveillance system for recording an inputted video signal together with a continuous audio signal on a periodically operated magnetic tape, comprising:
  driving means for running said magnetic tape periodically,
  FM modulation means for modulating the frequency of the inputted video signal,
  AD converting means for continuously converting the inputted audio signal into a digital signal which is suitable to be recorded on said magnetic tape,
  bit converting means for compressing the bit number of the digital signal which is an output from said AD converting means,
  correction code generation means for adding an error correction code to the digital signal outputted from said bit number converting means,
  temporary storing means for storing the digital signal to which the error correction code is added by said correction code generation means,
  time base compression means for compressing the time base of said digital signal by reading the digital signal stored in said temporary storing means at a reading rate which is faster than the writing rate responsive to said periodic running of said magnetic tape,
  an audio head provided on the outer surface of said rotating drum and having a prescribed gap width and a prescribed azimuth angle for deep-recording the digital signal whose time base is compressed by said time base compressing means subsequently in adjacent audio tracks, and
  a video head provided on an outer surface of a rotating drum and having a gap width narrower than said audio head and an azimuth angle different from said audio head for surface-recording the video signal which is frequency-modulated by said FM modulation means subsequently in a track overlying a corresponding one of said audio tracks.

* * * * *